United States Patent
Oberholzer et al.

(10) Patent No.: US 11,858,066 B2
(45) Date of Patent: Jan. 2, 2024

(54) LASER PROCESSING MACHINE WITH FLUID FLOW NOZZLE CLEANING DEVICE

(71) Applicant: Bystronic Laser AG, Niederönz (CH)

(72) Inventors: Heinz Oberholzer, Küngoldingen (CH); Matthias Wüthrich, Langenthal (CH)

(73) Assignee: Bystronic Laser AG, Niederoenz (CH)

(*) Notice: Subject to any disclaimer, the term of this patent is extended or adjusted under 35 U.S.C. 154(b) by 604 days.

(21) Appl. No.: 15/446,139

(22) Filed: Mar. 1, 2017

(65) Prior Publication Data
US 2017/0252864 A1    Sep. 7, 2017

(30) Foreign Application Priority Data

Mar. 1, 2016 (EP) .................................... 16158135

(51) Int. Cl.
| | | |
|---|---|---|
| *B23K 26/142* | (2014.01) | |
| *B23K 26/16* | (2006.01) | |
| *B08B 15/00* | (2006.01) | |
| *B08B 5/02* | (2006.01) | |
| *B08B 15/04* | (2006.01) | |
| *B23K 26/14* | (2014.01) | |
| *B23K 26/38* | (2014.01) | |

(52) U.S. Cl.
CPC .............. *B23K 26/142* (2015.10); *B08B 5/02* (2013.01); *B08B 15/00* (2013.01); *B08B 15/04* (2013.01); *B23K 26/1488* (2013.01); *B23K 26/16* (2013.01); *B23K 26/38* (2013.01)

(58) Field of Classification Search
CPC ............ B23K 26/16; B23K 26/14–142; B23K 26/1488; B23K 26/38; B08B 15/00; B08B 15/04; B08B 5/02; B23Q 11/10

USPC ..................................................... 121/121.67
See application file for complete search history.

(56) References Cited

U.S. PATENT DOCUMENTS 4,441,934 A *  4/1984  Kawakami ......... B23Q 11/0046
                                               266/49
4,987,630 A *  1/1991  Allen ....................... B08B 5/02
                                               15/1.51

(Continued)

FOREIGN PATENT DOCUMENTS

DE      102011050749 A1    6/2012
EP         1010493 A1      6/2000

(Continued)

OTHER PUBLICATIONS

J. Ding, Development of a laminar flow local shielding device for wire + arc additive manufacture, Journal of Materials Processing Technology, vol. 226, p. 100 (Year: 2015).*

(Continued)

*Primary Examiner* — Nathaniel E Wiehe
*Assistant Examiner* — Spencer H. Kirkwood
(74) *Attorney, Agent, or Firm* — Jacob Eisenberg

(57) ABSTRACT

The invention relates to a laser processing machine (11) with a laser processing head (12), with a support grate (16) that defines a support plane (A) for supporting a workpiece (8) to be processed, with a fluid supply device (21) and with a fluid removal device (31). The fluid supply device (21) and fluid removal device (31) are designed to generate a fluid flow (27) under the support plane (A) of the support grate (16). The fluid supply device (21) can be moved with the laser processing head (12).

16 Claims, 5 Drawing Sheets

(56) References Cited

U.S. PATENT DOCUMENTS

| | | | | |
|---|---|---|---|---|
| 5,624,309 | A * | 4/1997 | Schuepstuhl | B23K 9/325 |
| | | | | 454/49 |
| 6,664,495 | B2 * | 12/2003 | Yamaguchi | B23K 37/0461 |
| | | | | 219/121.48 |
| 7,674,998 | B2 * | 3/2010 | Ohnishi | B23K 7/00 |
| | | | | 219/121.39 |
| 9,468,958 | B2 * | 10/2016 | Hammers | B08B 15/002 |
| 9,505,096 | B2 * | 11/2016 | Schweizer | B23K 26/142 |
| 2005/0140071 | A1 * | 6/2005 | Reist | B23K 37/0408 |
| | | | | 266/48 |
| 2009/0233536 | A1 * | 9/2009 | Crees | B23K 26/38 |
| | | | | 83/578 |
| 2012/0192718 | A1 * | 8/2012 | Sukhman | B01D 53/04 |
| | | | | 55/318 |

FOREIGN PATENT DOCUMENTS

| | | | | |
|---|---|---|---|---|
| EP | 1772671 A1 * | 4/2007 | | B08B 9/00 |
| WO | 2015068649 A1 | 5/2015 | | |

OTHER PUBLICATIONS

Kirt Boston, Thermal Cutting Dust Collection—Balancing the variables, Donaldson Filtration solutions. Apr. 2012. (Year: 2012).*

Portalbi, Fiber laser plasma combo cutting, Jan. 28, 2013, Youtube, (Year: 2013).*

* cited by examiner

LASER PROCESSING MACHINE WITH FLUID FLOW NOZZLE CLEANING DEVICE

CROSS-REFERENCE TO RELATED APPLICATIONS

This patent application claims priority to the European patent application No. 16158135.0 filed on Mar. 1, 2016, fully incorporated herein by reference.

BACKGROUND OF THE INVENTION

The invention relates to a laser processing machine according to the preamble to claim 1.

During laser processing, and in particular during laser cutting, flue gases and residue accumulate in the dust collection space of the laser processing machines, such as melted workpiece material or dust that gets deposited on the bottom of the workpiece. The processed workpiece, e.g., a metal sheet, can become contaminated in such a way that requires mechanical cleaning prior to subsequent painting, since the paint will otherwise not adhere to the workpiece.

Known for removing the dust and flue gas that accumulates in the dust collection space are laser processing machines, in which a current is generated.

For example, DE102011050749A1 shows laser processing machine with suction device, which siphons off residue that accumulates on the side of the workpiece facing the laser processing head.

The disadvantage to the known solution is that only a limited amount in particular of the flue gases that accumulate in the dust collection space are removed with this suction device. Residue in the dust collection space cannot be eliminated at all with this known solution.

For example, WO2015068649A1 shows a laser processing machine that exhibits a laser processing head, a support grate, which defines a support plane for supporting a workpiece to be processed, a fluid supply device and a fluid removal device. The fluid supply device and fluid removal device are designed to generate a fluid flow (here an airflow) under the support plane of the support grate for removing in particular flue gas and dust.

In order to hold down the energy consumption for generating the flow, the dust collection space of the laser processing machine according to WO2015068649A1 incorporates guide plates, which divide the latter into dust collection space sections. A fluid supply device and fluid removal device are provided for each dust collection space section.

The disadvantage to the known solution is that the laser processing machine and in particular the configuration of the dust collection space is material-intensive and expensive to manufacture.

Supplying the fluid over the entire length and width of the dust collection space or laser processing machine according to WO2015068649A1 would waste a great deal of energy, since flows are here also generated in regions where the laser processing head does not process the workpiece.

BRIEF SUMMARY OF THE INVENTION

Therefore, the object of the present invention is to create a laser processing machine, in particular a laser cutting machine, which does not have the aforementioned disadvantages, and which is energy efficient and easy to manufacture, in particular while ensuring a sufficient removal of flue gas and dust.

The object is achieved with the features in the independent claim. Advantageous further developments are described in the figures and dependent claims.

According to the invention, the at least one fluid supply device can be moved with the laser processing head.

The at least one fluid supply device encompasses a fluid supply, a distributor, which covers a certain stream width of the laser processing head, and at least one outlet opening for the fluid, which influences the flow shape, flow width and flow rate.

Since the fluid is thus supplied by the at least one fluid supply device in a targeted and directed manner under the support plane, fluid is supplied only in the region where it is required and advantageously optimal for removing residue and flue gases. No additional or even limited structural measures in the dust collection space of the laser processing machine are required for a reliable and simple smoke extraction from the dust collection space. In addition to the simpler structural configuration of the laser processing machine, the requirements placed on its control can also be reduced.

The targeted flow also avoids so-called dead water zones in the dust collection space.

The directed flow makes it possible to build up a good inflow of fluid and a good separation from the flue gas with little energy. The efficient extraction of smoke from the dust collection space along with the arising protective boundary layer between the bottom of the workpiece and flue gas prevent undesired deposits on the bottom of the workpiece.

In addition, slag that accrues during processing and the liquid workpiece material that results from laser processing are directly cooled, and no longer damage the dust collection space. Furthermore, configuring the laser processing machine according to the invention makes it possible to use lasers with a higher power (e.g., 6 kW and up), since their damaging influence as a limitation on laser power is reduced by the generated flow. This substantially reduces the danger of damage to the dust collection space, and thus significantly lengthens its suitability for use.

The at least one fluid removal device is advantageously stationary, which also enables a simple structural and cost-effective configuration of the laser processing machine. In addition, the at least one fluid removal device can be operated with a lower energy consumption, since the targeted flow carries the flue gases in the direction of the at least one fluid removal device.

The at least one fluid removal device advantageously encompasses at least one filter element, which takes up at least a portion of the flue gas and cutting dust, thereby preventing or at least substantially reducing a contamination of the environment of the laser processing machine.

Further, the laser processing machine according to the invention eliminates a plurality of valves as well as the need to control the plurality of valves, since the fluid is not supplied in sections. Because of the simpler fluid supply, substantial pressure losses no longer arise therein, which additionally has a positive effect on the energy consumption of the laser processing machine. This eliminates the need for a structural reconfiguration or special configuration with respect to the frame of the laser processing machine for supplying the fluid. The entire structure of the laser processing machine is significantly simplified by the solution according to the invention, which advantageously impacts its manufacturing costs.

The at least one fluid supply device can advantageously be moved with the laser processing head parallel in a moving direction of the latter, so that the at least one fluid supply device and laser processing head exhibit a constant alignment from a spatial standpoint while moving relative to each other. The at least one fluid supply device and laser processing head are especially advantageously moved simultaneously to each other.

To this end, the at least one fluid supply device and the laser processing head advantageously exhibit a structurally designed coupling. The fluid supply is also structurally simplified in such a configuration, since the fluid line can be arranged on or in the coupling.

The overall length of the fluid line can thereby also be reduced relative to the conventional configurations, which has a positive effect in particular in relation to the pressure conditions. A fixed supply in or near the middle of the entire traversed path is provided for this purpose, for example.

The fluid supply device and fluid removal device are both situated under the support plane for removing flue gas and dust under the workpiece, wherein the fluid supply device can be traversed by the laser processing head. This makes flue gas and dust removal simpler, more efficient and more complete than is the case for a laser processing machine according prior art.

The support grate preferably encompasses several grate elements situated parallel and spaced a distance apart relative to each other, wherein the at least one fluid supply device is designed to generate fluid flow that runs parallel to the grate elements. As a consequence, these grate elements comprise guide elements for the flow, and improve the supply of fluid and removal of flue gases and residue as well. All grate elements preferably are spaced about the same distance apart. Tests have shown that a sufficient flow for removing the residue can be generated with up to 12 times less an amount of fluid.

The at least one fluid supply device and laser processing head are preferably arranged on a shared bridge, which can be moved relative to the support grate. The bridge, also referred to as a cutting bridge, usually completely spans the support grate in a direction of the latter, and serves to position the laser processing head relative to the workpiece being processed for processing purposes. Arranging the at least one fluid supply device on the bridge is an easy way to ensure that the at least one fluid supply device remains in the desired alignment for generating an optimal flow, even while repositioning the laser processing head. The fluid supply is advantageously also secured to the bridge.

In an alternative embodiment, the at least one fluid supply device is arranged on a separate guide, and can move along the support grate, wherein the controller required for this purpose is advantageously coupled with the controller of the laser processing head, or at least synchronized therewith. This can also ensure a parallel movement of the at least one fluid supply device and laser processing head, despite their separate configuration. For example, the separate guide encompasses a guide rail, along or upon which the at least one fluid supply device is guided while moving.

Both of the aforementioned variants ensure that a directed flow can be generated in the direction of the operating point of the laser processing head with a slight quantity of the fluid under the workpiece. The at least one fluid supply device can preferably be adjusted, e.g., moved, relative to the support plane of the support grate, so that the distance between the fluid supply and support plane of the support grate can be adjusted as needed. To achieve a simple configuration for the corresponding structure and controller for the latter, the at least one fluid supply device can advantageously be swiveled and/or moved perpendicular to the support plane of the support grate.

The at least one fluid supply device preferably exhibits at least one nozzle, thereby easily ensuring a targeted supply of the fluid, and hence a directed flow.

In this context, the term "nozzle" refers to a tubular device with a length and an outlet opening. The cross section of the nozzle exhibits the same area over the entire length, expanding or tapering. If required, a nozzle can also exhibit a shape for the cross section that is more complex and/or varies over the length. The cross section itself can be round, circular or polygonal in design, wherein the length and width of the cross section deviate strongly from each other. In particular the outlet opening of the nozzle can also be configured as a slit.

For example, the at least one nozzle can be used to influence the flow shape, flow width and/or flow rate of the generated flow to reflect the requirements and wishes.

The at least one fluid supply device preferably exhibits several nozzles arranged one next to the other. If need be, the nozzles can here all be identical or similar in design, or vary in design. While ensuring the directed flow, the several nozzles can be used to elevate the width expansion of the latter, and thereby cover a larger area under the laser processing head. The nozzles are advantageously spaced apart from each other in such a way that the support grate does not adversely affect the progression of the flow generated by the at least one fluid supply device.

Several of the nozzles are preferably arranged on a shared line, making it easy to generate a directed flow with a broad expansion.

An arrangement comprised of several nozzles on a shared line aligned so as to run parallel to the support plane of the support grate has proven especially advantageous for generating an ideal flow.

The at least one nozzle is preferably situated under the support plane of the support grate, thereby ensuring a progression of the generated flow under the workpiece to be processed.

If a fluid supply device with several nozzles is provided, all nozzles are advantageously situated under the support plane of the support grate, so that a flow advantageous for removing the residue can be generated.

Aside from the at least one nozzle situated under the support plane of the support grate, at least one additional nozzle can in one variant be situated above the support plane of the support grate, thereby also generating a flow above the workpiece, for example which additionally supports a residue removal on the workpiece top or cools the workpiece at the processing point.

The several nozzles arranged one next to the other preferably are spaced apart from each other by less than the distance between the grate elements. This prevents all nozzles from blowing on the grate bars. This also ensures that a flow passes through all sectors between the grate bars in the area of the nozzles, and, in particular as opposed to a nozzle distance that exceeds the distance between the grate elements, no sector in this area fails to carry a flow or is left out. All nozzles are advantageously spaced about the same distance apart from each other.

The at least one nozzle is preferably replaceably arranged in or on the at least one fluid supply device, so that the latter can be replaced or exchanged as required. The at least one nozzle becomes worn with use over time. The replaceability makes it possible to provide a new nozzle as a separate component, and the at least one fluid supply device does not have to be entirely exchanged. In addition, various types and/or configurations of nozzles can be provided in or on the at least one fluid supply device, for example which are selected based on the type of processing, the type of material of the workpiece and/or the type of fluid.

The shape and configuration of the at least one nozzle are advantageously selected in such a way as to achieve as directed or broad a fluid supply as possible in the work area of the laser processing head. Depending on the type of preferred cutting process, various nozzle shapes and nozzle diameters can also be used.

The at least one nozzle is preferably arranged in or on the at least one fluid supply device so that it can move in at least one degree of freedom, making it possible to generate an oscillating flow. The at least one nozzle is advantageously mounted so that it can move in several degrees of freedom, so that flows can be generated in several directions. For example, the at least one nozzle is situated in an advantageously elastic mounting body, e.g., one made out of an elastomer or a rubber material. It is further advantageous to provide a flexible supply line, thereby ensuring the supply of fluid even given such an arrangement of the at least one nozzle.

The alignment of the at least one nozzle can preferably be set relative to the at least one fluid supply device, so that the flow can be aligned as needed, and an optimal angle of incidence can be achieved for the fluid relative to the workpiece. The setting device for the at least one fluid supply device is designed to be automatically or manually actuated.

It has proven especially advantageous for the fluid to be introduced as close as possible to a workpiece edge, so that a sufficient fluid layer (boundary layer) can be generated on the workpiece bottom, while not disrupting the processing operation, e.g., the cutting or insertion process, on the workpiece top. This can be easily ensured with at least one alignable nozzle. It can also be expedient to locate the gas supply under the metal sheet, and upwardly supply the fluid at an inclination on the metal sheet bottom.

Depending on the positioning of the workpiece relative to the laser processing head or the laser processing head relative to the workpiece, the optimal inflow point for an optimal flow shifts. In this case, the fluid supply must be adjusted accordingly.

In one variant, not just at least one nozzle, but rather the at least one fluid supply device as, a whole can be aligned relative to the support plane, so, that the progression of flow can also be adjusted as needed.

The supplied fluid is preferably a gas, since gas is easy to supply as a fluid, and especially suitable for generating the desired flow. Gases other than air can also be used, wherein additional advantages accrue depending on the type of gas. For example, oxygen as the fluid supports the cutting process during laser cutting. Nitrogen as the fluid also serves as an inert protective gas during laser cutting.

Also possible for use as the fluid is water vapor, for example which offers special advantages by binding flue gas.

For example, the fluid, e.g., air, can also be passively supplied, i.e., only via the effect of the operational fluid removal device. To this end, for example, the fluid removal device encompasses suction devices and/or ventilators. A passive fluid supply can also be generated by a negative pressure prevailing in the dust collection space. To achieve an advantageous passive fluid supply, for example, the at least one fluid supply device exhibits an opening, which ensures the targeted supply of the corresponding fluid (e.g., air) via a supply line. A passive fluid supply makes it possible to save more energy by comparison to conventional solutions.

A gaseous fluid is preferably blown in, i.e., introduced into the dust collection space under pressure. Compressed air (pressurized air) has proven especially advantageous, can be cost-effectively made available, and is often a component in an existing infrastructure in which laser processing machines are normally installed.

It is further advantageous that the fluid be blown in pulsed, so that the flow layers shift. This makes it possible to additionally avoid dead water between flow layers.

It is further advantageous that the fluid be supplied dynamically, e.g., as a function of the cutting plan and/or as a function of the position of the laser processing head.

At least one fluid regulating device for regulating the fluid pressure is preferably provided, with which the quantity of discharged fluid can be adjusted and optimized to the respective application for generating and adjusting the desired flow. In this way, for example, the pressure is altered depending on the distance from the operating point on the workpiece, so that processing is not negatively influenced by the fluid supply.

Alternatively or additionally, the at least one fluid regulating device regulates the fluid flow rate, making it possible to easily generate and adjust the preferred flow.

The aforementioned measures can be used to set or change the discharged fluid quantity as a function of the processing operation and/or workpiece material.

The fluid quantity is advantageously adjusted dynamically, and further advantageously based on data from the controller of the laser processing machine.

A protective device is provided to at least partially protect at least the at least one fluid supply device against residue and/or stock material spatter that arises during the processing operation, thereby protecting the at least one fluid supply device in particular against contamination, and thus ensuring a longer suitability of use for the latter. For example, flap elements are provided, which are positioned at least in front of a part of the at least one fluid supply device, for example when the latter is not in use.

Alternatively or additionally thereto, a nozzle cleaning device is provided for the at least one nozzle, which clears any contaminants present therein from the latter. The at least one nozzle cleaning device is advantageously designed in such a way that at least one nozzle is automatically cleaned, if necessary. For example, the nozzle cleaning device encompasses at least one brush, e.g., which can be moved from a parked position into a position for cleaning the at least one nozzle and back again, as needed.

At least two fluid supply devices are preferably provided, which is advantageous especially given larger formats of the workpiece. The at least two fluid supply devices make it possible to generate an optimal flow at a low energy demand, even for these workpieces. In such a configuration, the at least one fluid removal device is provided on a front side of the dust collection space or centrally, for example in the middle of the dust collection space. In an embodiment with bilateral fluid supply, a pulsed supply has additionally proven to be especially advantageous, since flow layers in varying alignments or expansions can thereby be generated.

The at least two fluid supply devices are preferably arranged one opposite the other, so that a large length or surface of the workpiece bottom can be covered with a slight flow pressure for the flow.

For example, the at least two fluid supply devices are offset relative to each other and arranged one opposite the other, so that, in particular given a support grate with grate elements, opposite flows for eliminating flue gases under the workpiece can easily be generated between the latter. It is here conceivable that the fluid be alternatingly supplied from a respective side by means of one of the at least two fluid supply devices.

Alternatively, the at least two fluid supply devices are situated directly opposite each other, which is advantageous given at least one fluid removal device arranged in the dust collection space.

For example, tailoring the arrangement of the at least one fluid removal device to the flow conditions in the dust collection space makes it possible to prevent the oppositely directed flows from possibly creating zones with eddies.

It is further advantageous that the at least two fluid supply devices can be moved synchronously with each other, so as to ensure an optimal coverage with the generated flows. The at least two fluid supply devices can here be structurally coupled with each other and/or situated on the bridge.

In an alternative, the at least two fluid supply devices can be moved separately from each other, but are advantageously each controlled in such a way as to only move synchronously. A single controller can be provided for this purpose, as can several controllers, but in that case the latter advantageously communicate with each other.

Additional advantages, features and details of the invention may be gleaned from the following description, in which exemplary embodiments of the invention are described with reference to the drawings. The features mentioned in the claims and in the description can here be significant to the invention whether taken in isolation or in any combination.

BRIEF DESCRIPTION OF THE SEVERAL VIEWS OF THE DRAWINGS

Just as the technical content of the claims and figures, the reference list is a component of the disclosure. The figures are described in a coherent and overarching manner. The same reference numbers refer to the same components, while reference numbers with differing indices denote functionally identical or similar components.

Shown here on.

DETAILED DESCRIPTION OF THE INVENTION

Figure 1:
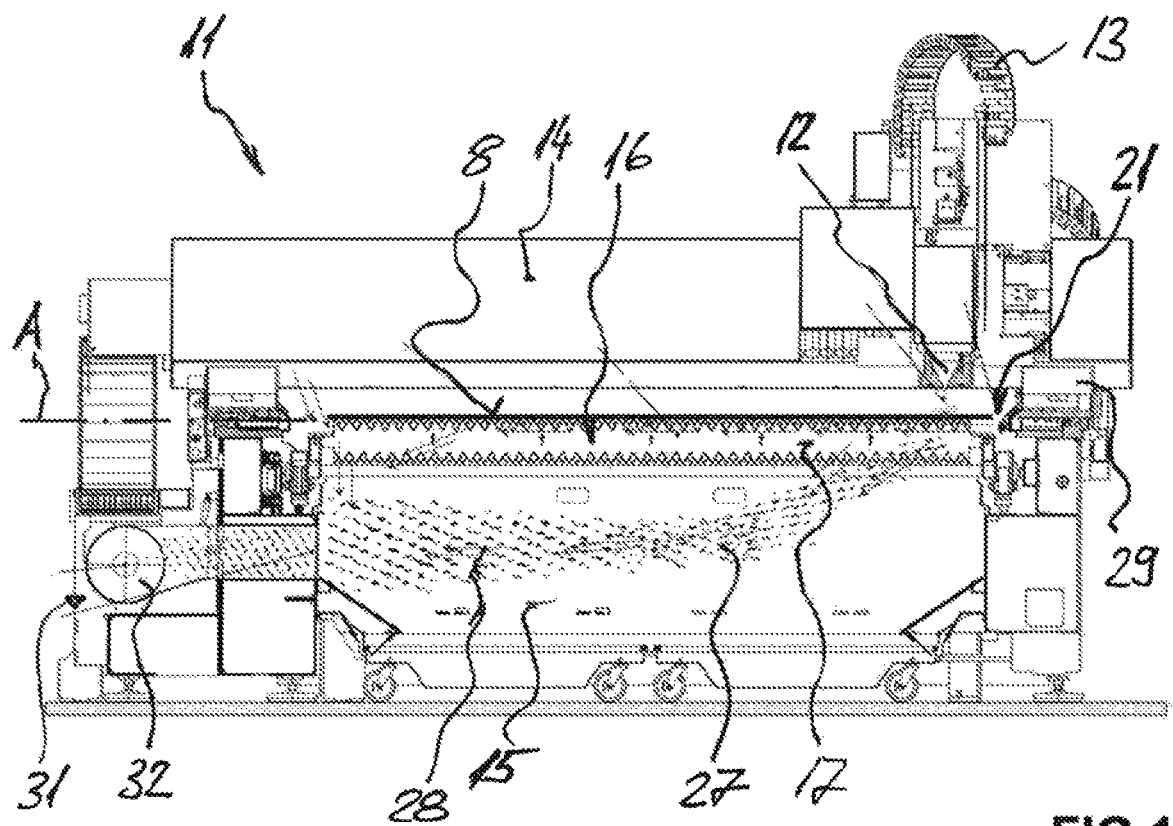
FIG. 1 is a cross section through a laser processing machine according to the invention.
Figure 2:
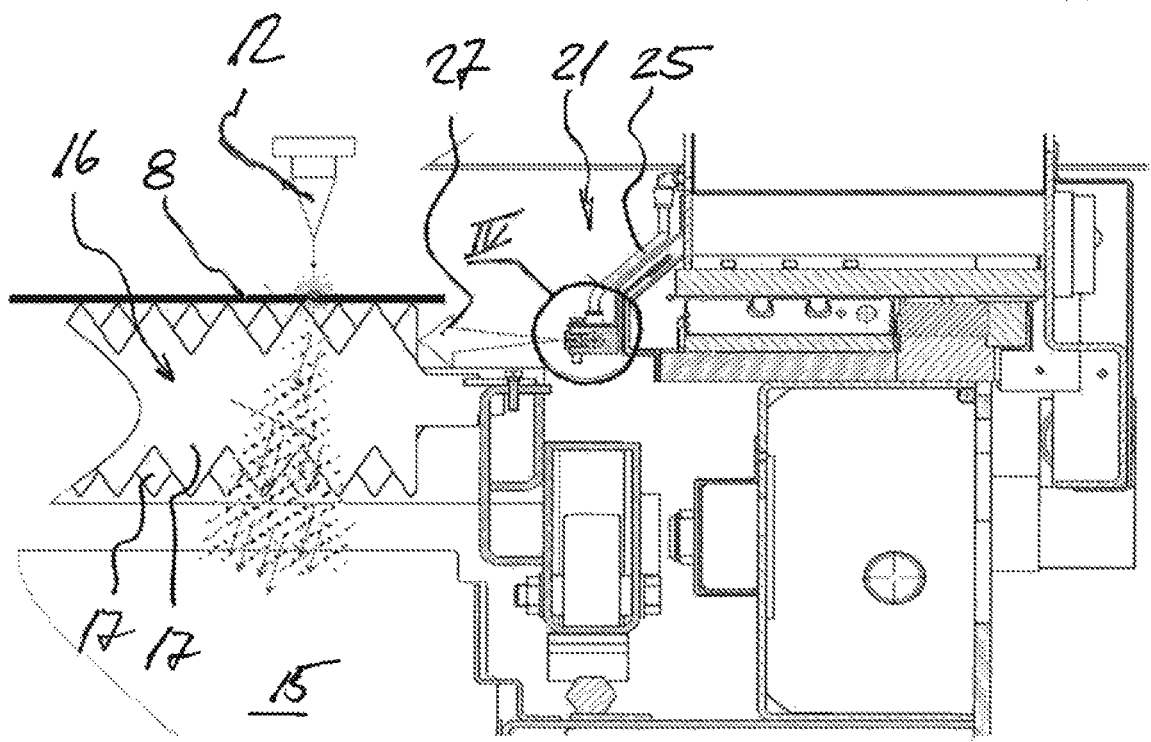
FIG. 2 is a detail of FIG. 1.
Figure 3:
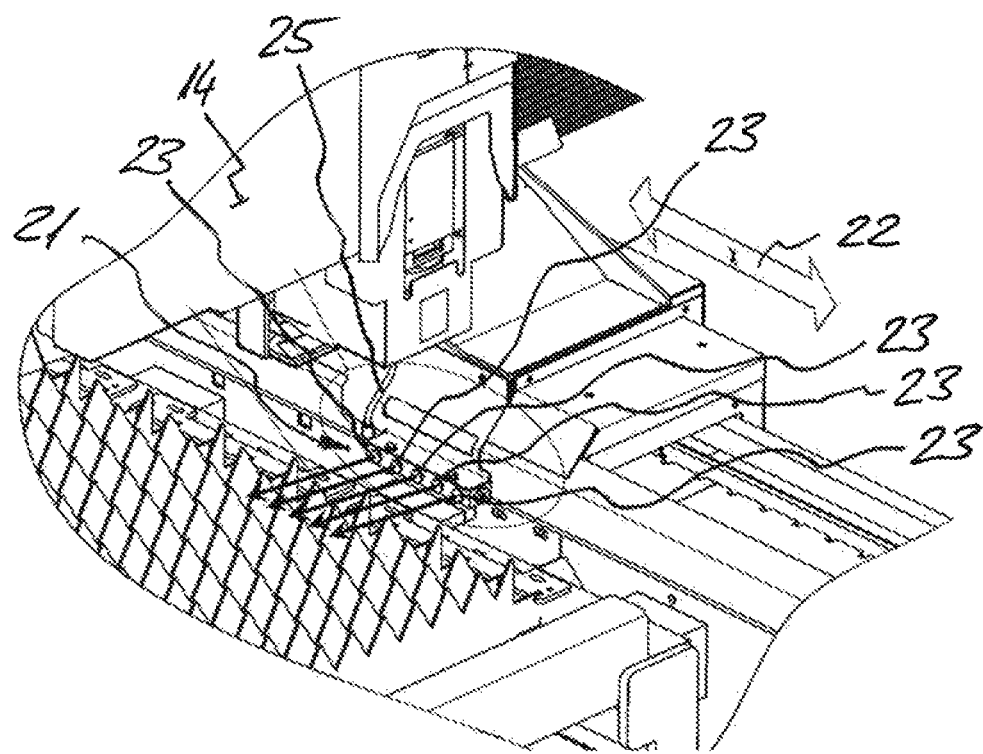
FIG. 3 is the detail according to FIG. 2 in a perspective view.

The laser processing machine 11 shown on FIG. 1 to 3 is a laser cutting machine with a laser cutting head 12 as the laser processing head. The laser processing machine 11 further encompasses a dust collection space 15, which is covered by a support grate 16. The support grate 16 defines a support plane A for supporting a workpiece 8 to be processed. The support grate 16 encompasses several grate elements 17 that are parallel to each other and spaced apart from each other.

The laser cutting head 12 is arranged on a bridge 14. In order to position the laser cutting head 12 relative to the workpiece 8, the latter can be moved along the bridge 14 as well as with this bridge 14 into a moving direction (double arrow 22) of the laser cutting head 12. The energy is supplied to the laser cutting head 12 via the flexible feeder 13, also referred to as supply chain.

Further provided are a fluid supply device 21 and a fluid removal device 31, which are designed to generate a fluid flow 27 running parallel to the grate elements 17 of the support grate 16 under the support plane A of the support grate 16, and to remove flue gas 28 and dust, for example.

The fluid removal device 31 encompasses a suction tube 32, in which a negative pressure prevails. Alternatively or additionally, at least one ventilator can be provided, which generates a negative pressure in the area of the fluid removal device 31.

The fluid supply device 21 can be moved parallel with the laser processing head 12 in a displacement direction of the latter. In the embodiment shown on FIG. 1, the fluid supply device 21 is to this end situated on the bridge 14, on which the laser processing head 12 is also located.

The fluid supply device 21 exhibits several nozzles 23 arranged one next to the other, which are situated on a shared line. The nozzles 23 are located under the support plane A of the support grate 16.

Figure 4:
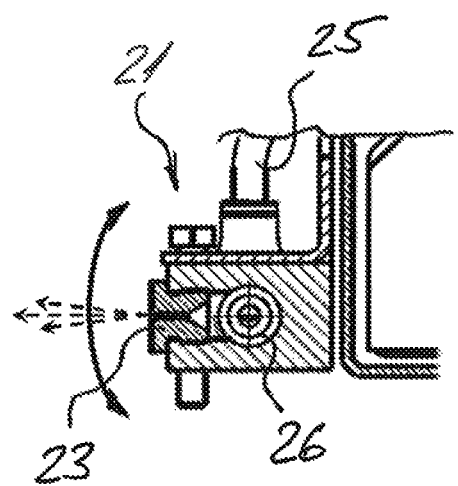
FIG. 4 is a detail through a nozzle of the fluid supply device.

Each nozzle 23 is replaceably arranged in the fluid supply device 21, and adjustable in its alignment relative to the fluid supply device 21 or the support plane A of the support grate 16 (see FIG. 4).

The supplied fluid is a gas, advantageously air. The air is blown in pulsed. The air is supplied via the supply line 25 to the fluid supply device 21, and routed in the latter to the nozzles 23 via the supply channel 26. For example, the supply channel 26 can here incorporate valves, so as to supply individual nozzles 23 with the fluid or separate them from the latter.

The laser processing machine 11 further exhibits a fluid regulating device 29 for regulating the fluid pressure and/or fluid flow rate.

Figure 6:
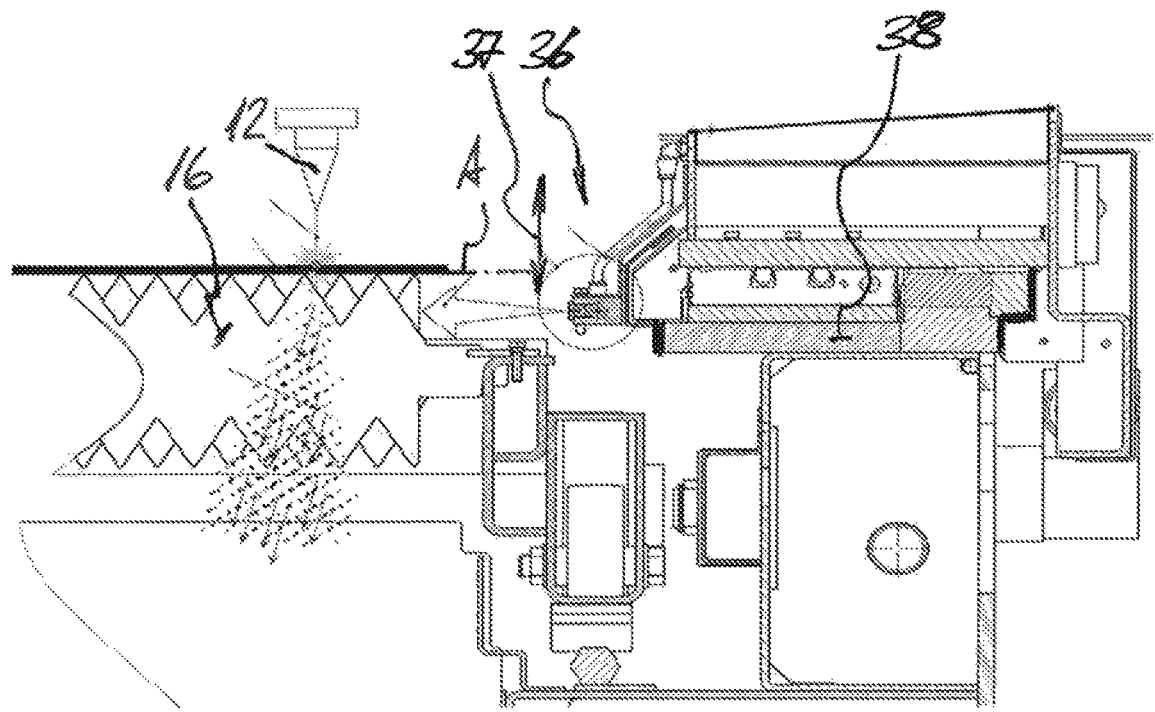
FIG. 6 is a detail similar to FIG. 2, but with another variant of a fluid supply device.

The fluid supply device 36 shown on FIG. 6 is designed similarly to the fluid supply device 21, but situated on a separate guide (here the guide rail 38). The fluid supply device 36 can be moved along the support grate 16, advantageously together with the laser processing head 12. The fluid supply device 51 can be adjusted relative to the support plane A of the support grate 16 in the direction of the double arrow 37, e.g., swiveled or moved.

Figure 5:
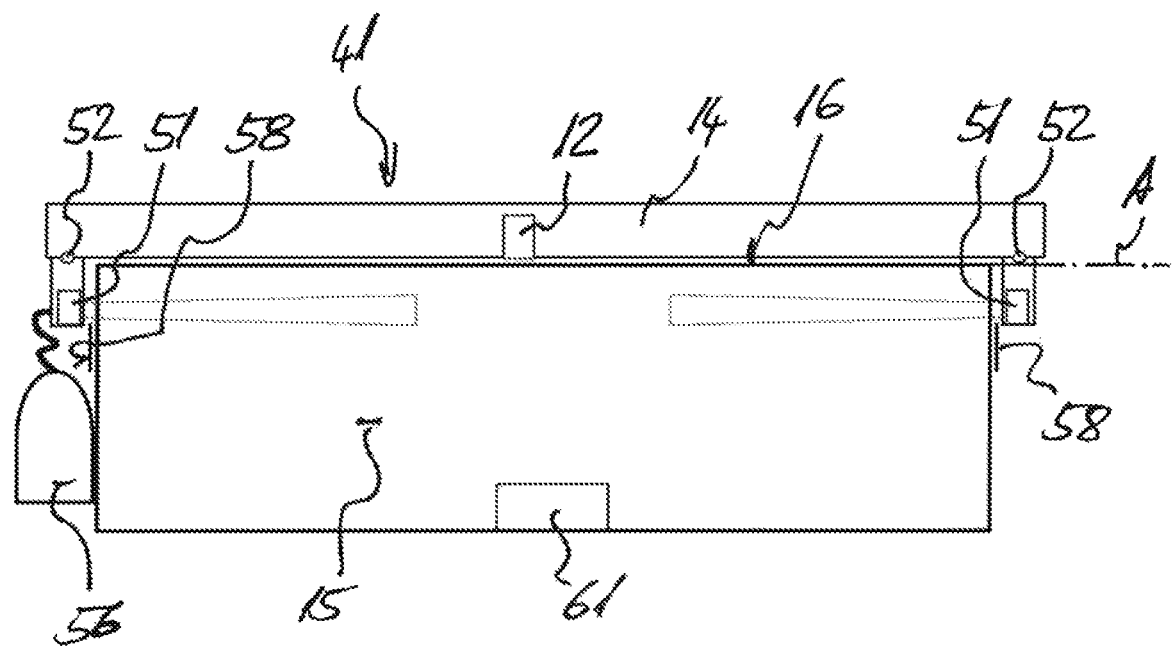
FIG. 5 is a schematic section through a variant of a laser processing machine according to the invention.

Provided in the laser processing machine 41 according to FIG. 5 are two fluid supply devices 51, which are situated opposite each other and can be moved synchronously with each other. For example, the fluid supply devices 51 are each designed similarly to the fluid supply device 21 described above. Each fluid supply device 51 can be swiveled around a respective swiveling axis 52, and hence can be aligned relative to the support plane A of the support grate 16. Pressurized air is used as the fluid, and provided by a compressor 56 of the laser processing machine 41.

Further provided for each fluid supply device 51 is a respective flap-shaped protective device 58. Each protective device 58 can be separately actuated, and is pushed in front of the respective fluid supply device 51 for at least partially protecting against residue of the latter that accumulates during the processing operation.

The fluid removal device 51 is centrally located in the dust collection space 15.

However, this dust collection space 15 could also be divided into several separate segments, wherein a separate fluid removal device is then advantageously situated in each of the segments.

To support the formation of a directed flow, the or each fluid removal device can also be positioned on the side of the dust collection space 15 lying opposite the supply device, and preferably aligned parallel thereto.

Figure 7:
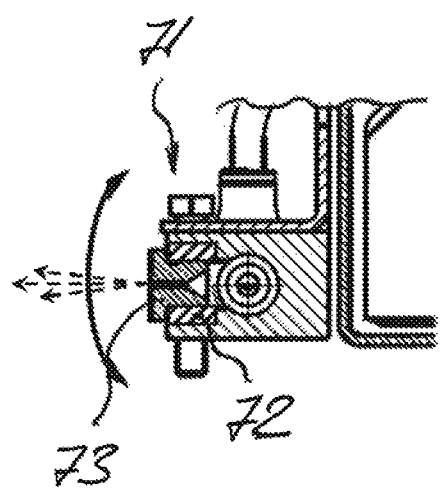
FIG. 7 is a detail through a nozzle of another fluid supply device.

In the fluid supply device 71 shown on FIG. 7, the nozzle 73 is mounted in an advantageously elastic mounting body, e.g., one made out of an elastomer, in or on the fluid supply device 71. While supplying the fluid, the nozzle 73 can move in several degrees of freedom.

Figure 8:
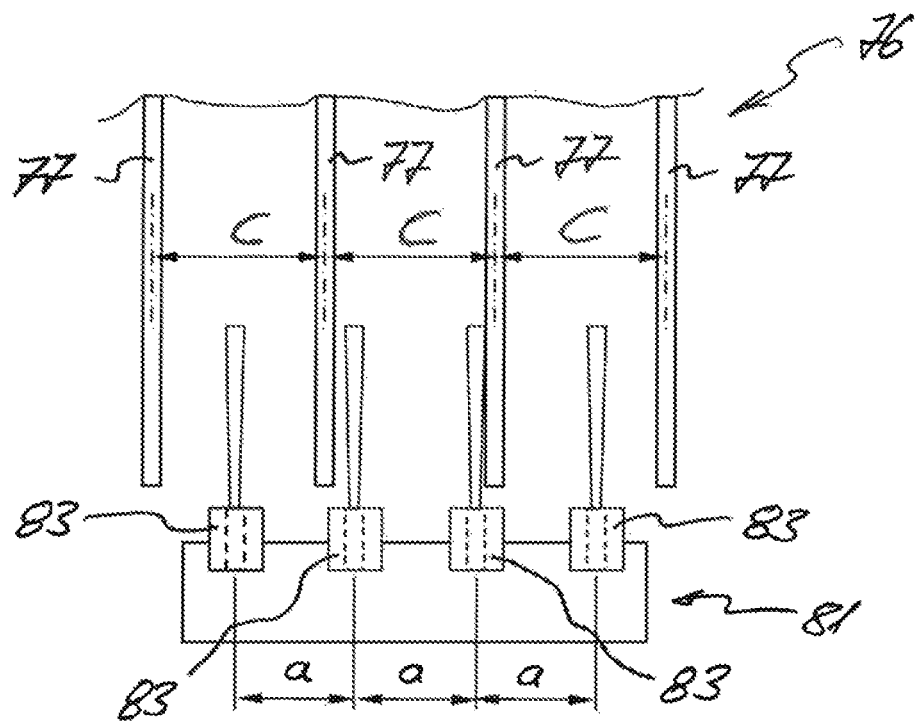
FIG. 8 is a schematic top view of a fluid supply device and support grate.

In the embodiment shown on FIG. 8, the several nozzles 83 of the fluid supply device 81 arranged one next to the other are each spaced apart a distance a less than the distance C between the grate elements 77 of the support grate 75.

Figure 9:
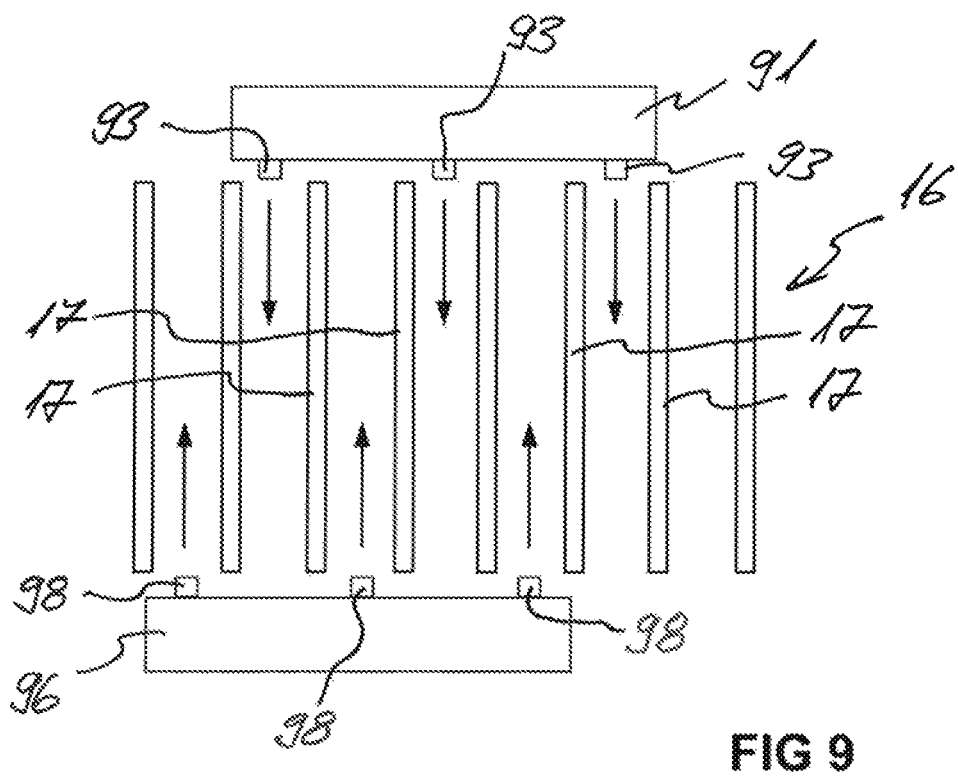
FIG. 9 is a schematic top view of a support grate.

Provided in the embodiment according to FIG. 9 are two fluid supply devices 91 and 96, which are situated one opposite the other and offset relative to each other. The nozzles 93 of the fluid supply device 91 and nozzles 98 of the fluid supply device 96 are arranged in such a way that opposing flows are present between the grate elements 17 of the support grate 16. The fluid supply devices 91 and 96 are preferably moved synchronously with each other in this example.

Figure 10:
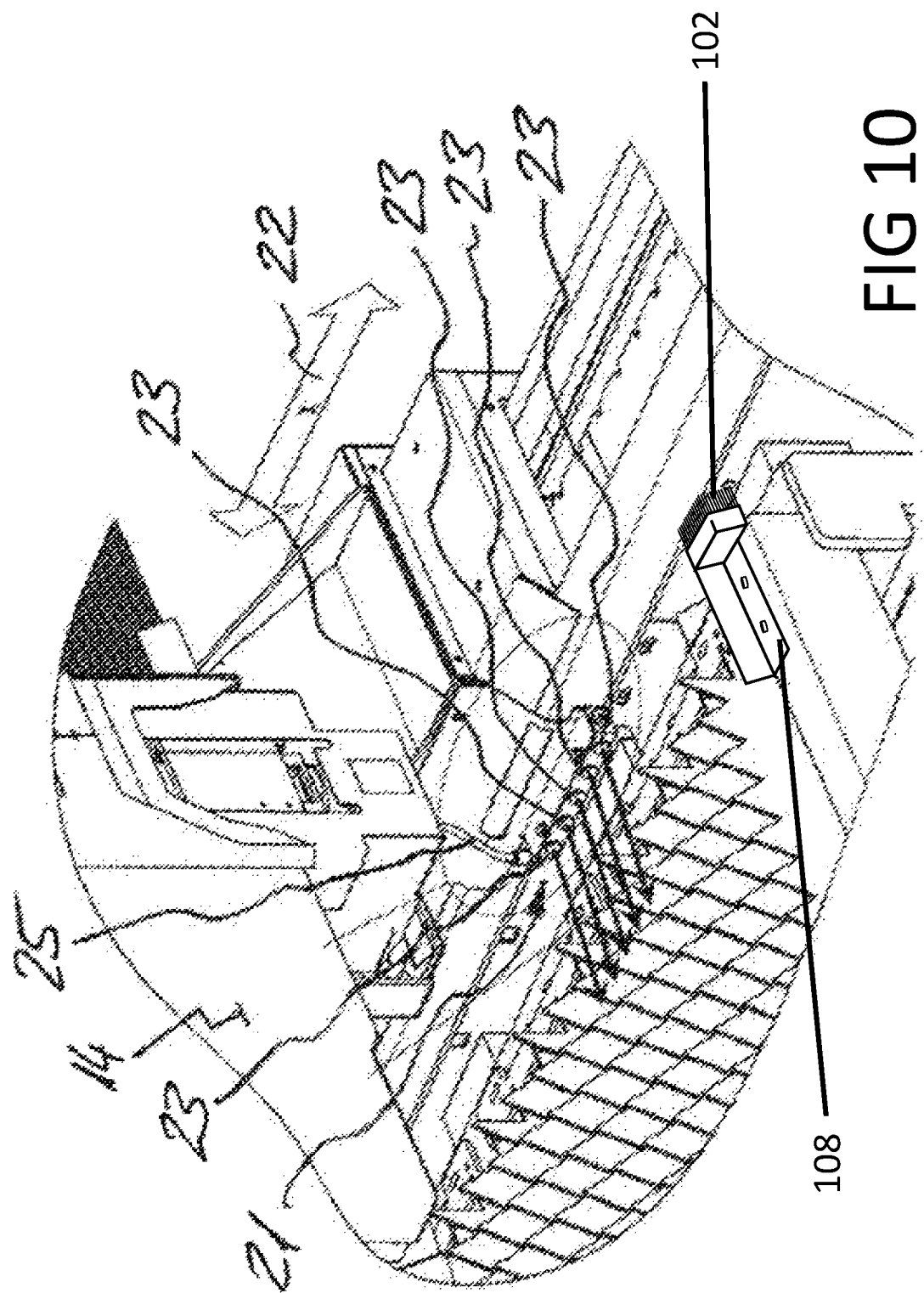
FIG. 10 depicts the cleaning device.

FIG. 10 depicts nozzles 23 configured to be fed by a fluid supply line and arranged on shared line for lateral displacement 22 which brings the nozzles 23 past brushes 102, themselves appropriately mounted on a conventional mount 108. In operation, as the nozzles are brought past the brushes, the brushes sweep away any debris formed on the nozzles.

| Reference List | |
|---|---|
| 8 | Workpiece |
| 11 | Laser processing machine |
| 12 | Laser processing head |
| 13 | Flexible feeder |
| 14 | Bridge |
| 15 | Dust collection space |
| 16 | Support grate |
| 17 | Grate element |
| 21 | Fluid supply device |
| 22 | Double arrow |
| 23 | Nozzle |
| 25 | Supply line |
| 26 | Supply channel |
| 27 | Fluid flow |
| 28 | Flue gas |
| 31 | Fluid removal device |
| 32 | Suction tube |
| 36 | Fluid supply device |
| 37 | Double arrow |
| 38 | Guide |
| 41 | Laser processing machine |
| 51 | Fluid supply device |
| 52 | Swiveling axis |
| 56 | Compressor |
| 58 | Protective device |
| 61 | Fluid removal device |
| 71 | Fluid supply device |
| 72 | Storage body |
| 73 | Nozzle |
| 76 | Support grate |
| 77 | Grate element |
| 81 | Fluid supply device |
| 83 | Nozzle |
| 91 | Fluid supply device |
| 93 | Nozzle |
| 96 | Fluid supply device |
| 98 | Nozzle |
| A | Support plane for 16 |
| C | Distance for 77 |
| a | Distance for 83 |

The invention claimed is:

1. A laser cutting machine for processing a workpiece comprising:
a laser cutting head;
a support grate, wherein the support grate defines a support plane configured for supporting a workpiece to be processed by the laser cutting machine;
at least one fluid supply device and at least one fluid removal device, wherein the at least one fluid supply device and at least one fluid removal device are configured to generate a fluid flow under the support plane of the support grate capable of removing flue gas and dust generated by the processing of the workpiece;
wherein the at least one fluid supply device is additionally configured for a parallel direction of movement with a movement of the laser cutting head, and
wherein the at least one fluid supply device further includes at least one nozzle arranged therein or thereon, at least one nozzle cleaning device configured to clean the at least one nozzle.

2. The laser cutting machine according to claim 1, wherein the support grate comprises several grate elements arranged in parallel and spaced apart, and wherein the at least one fluid supply device is configured to generate fluid flow that runs parallel to the grate elements.

3. The laser cutting machine according to claim 1, wherein the at least one fluid supply device and laser cutting head are arranged on a shared bridge, the at least one fluid supply device and the laser cutting head configured and arranged to move relative to the support grate.

4. The laser cutting machine according to claim 1, wherein the at least one fluid supply device is arranged on a guide such that the at least one fluid supply device can move along the support grate.

5. The laser cutting machine according to claim 1, wherein the at least one fluid supply device is configured and arranged to be adjusted relative to the support plane of the support grate.

6. The laser cutting machine according to claim 1, wherein the at least one fluid supply device comprises several nozzles arranged next to one another, wherein several of the several nozzles are further arranged on a shared line, and wherein the shared line is arranged parallel to the support plane of the support grate.

7. The laser cutting machine according to claim 6, wherein the several nozzles are further arranged spaced apart by a distance that is less than a distance between the grate elements.

8. The laser cutting machine according to claim 1, wherein the at least one nozzle is configured to be replaceable and arranged in or on the at least one fluid supply device.

9. The laser cutting machine according to claim 1, wherein the at least one nozzle is configured such that an alignment of said at least one nozzle can be set relative to the at least one fluid supply device.

10. The laser cutting machine according to claim 1, wherein fluid supplied by the fluid supply device is a gas and wherein the fluid supply device is configured to deliver the gas in at least one of, blown in and blown in pulsed.

11. The laser cutting machine according to claim 1, further comprising at least one fluid regulating device configured for regulating at least one of fluid pressure and fluid flow rate.

12. The laser cutting machine according to claim 1, further comprising a protective device configured for at least partially protecting at least the at least one fluid supply device against residue that accumulates during a processing operation.

13. The laser cutting machine according to claim 1, further comprising at least two fluid supply devices arranged at least one of opposite to one another and offset from one another, the at least two supply devices configured and further arranged to move synchronously with each other.

14. The laser cutting machine according to claim 1, wherein the at least one nozzle cleaning device is configured and arranged to clear contaminants present on the nozzle.

15. The laser cutting machine according to claim 1, wherein the at least one nozzle cleaning device is configured to clean automatically.

16. The laser cutting machine according to claim 1, wherein the at least one nozzle cleaning device further comprises at least one brush and the nozzle cleaning device is further configured to move the at least one brush between a parked position and a cleaning position.

\* \* \* \* \*